United States Patent [19]

Wolf

[11] Patent Number: 4,685,218
[45] Date of Patent: Aug. 11, 1987

[54] LEVEL SENSING UNIT AND A LEVEL INDICATING DEVICE BASED THEREON

[76] Inventor: Kenneth E. Wolf, 995 Sheridan, Wauconda, Ill. 60084

[21] Appl. No.: 901,384

[22] Filed: Aug. 28, 1986

[51] Int. Cl.⁴ .................................................. G01C 9/06
[52] U.S. Cl. ........................................... 33/366; 33/378
[58] Field of Search ......................... 33/366, 348, 378; 73/307, 308, 313

[56] References Cited

U.S. PATENT DOCUMENTS

| | | | |
|---|---|---|---|
| 738,407 | 9/1903 | Cable | 33/378 |
| 1,552,691 | 9/1925 | Girvin | 33/378 |
| 3,660,840 | 5/1972 | Plofchan | 33/366 X |
| 3,911,592 | 10/1975 | Crask | 33/366 X |
| 4,152,839 | 5/1979 | McDonald | 33/366 |
| 4,590,680 | 5/1986 | Hanchett et al. | 33/366 |

*Primary Examiner*—William D. Martin, Jr.
*Attorney, Agent, or Firm*—Eugene I. Snyder

[57] ABSTRACT

There is described a level sensing unit which is simple to operate, rugged in construction, sensitive to angular deviations of about 4 minutes 30 seconds, relatively inexpensive to construct, and very reliable. The unit is a sealed housing containing two communicating channels as fluid reservoirs opening into a compartment with an axle mounted between the channels and a float for each channel pivotally connected to the axle. Each float has an electrically conductive extension in electrical contact with the axle and directed toward a strip of similarly conductive material mounted within the housing. When the channels are filled with a nonconductive reactive fluid the extensions are in electrical contact with the strips when the floats are in a level condition, and the extensions become electrically disengaged through a buoyant force exerted on one float when the device is rotated so as to deviate from level.

4 Claims, 8 Drawing Figures

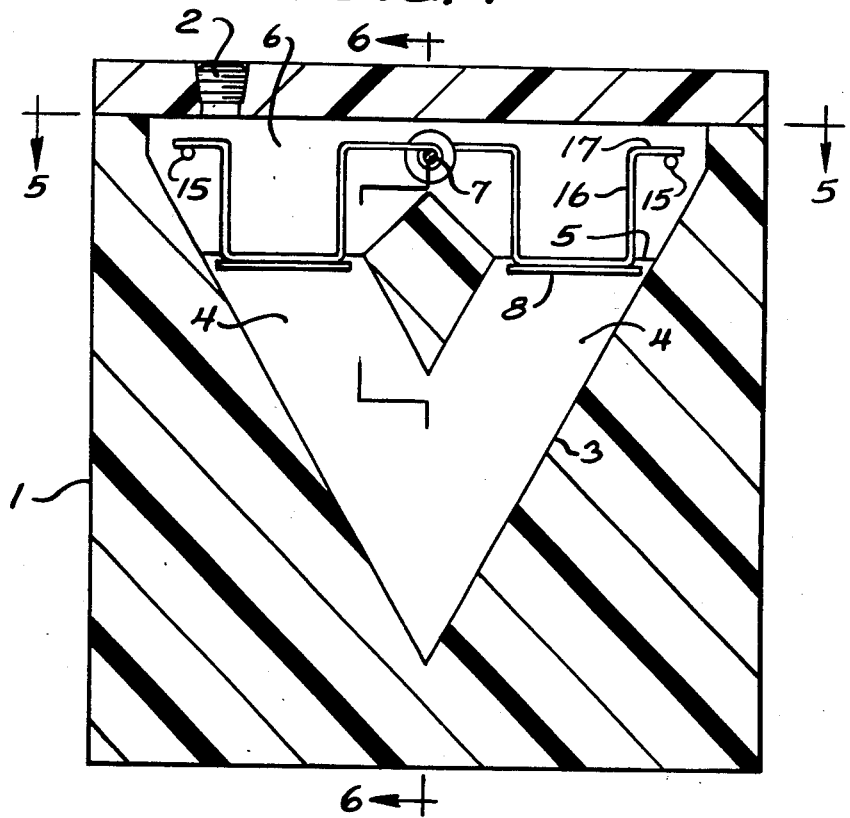
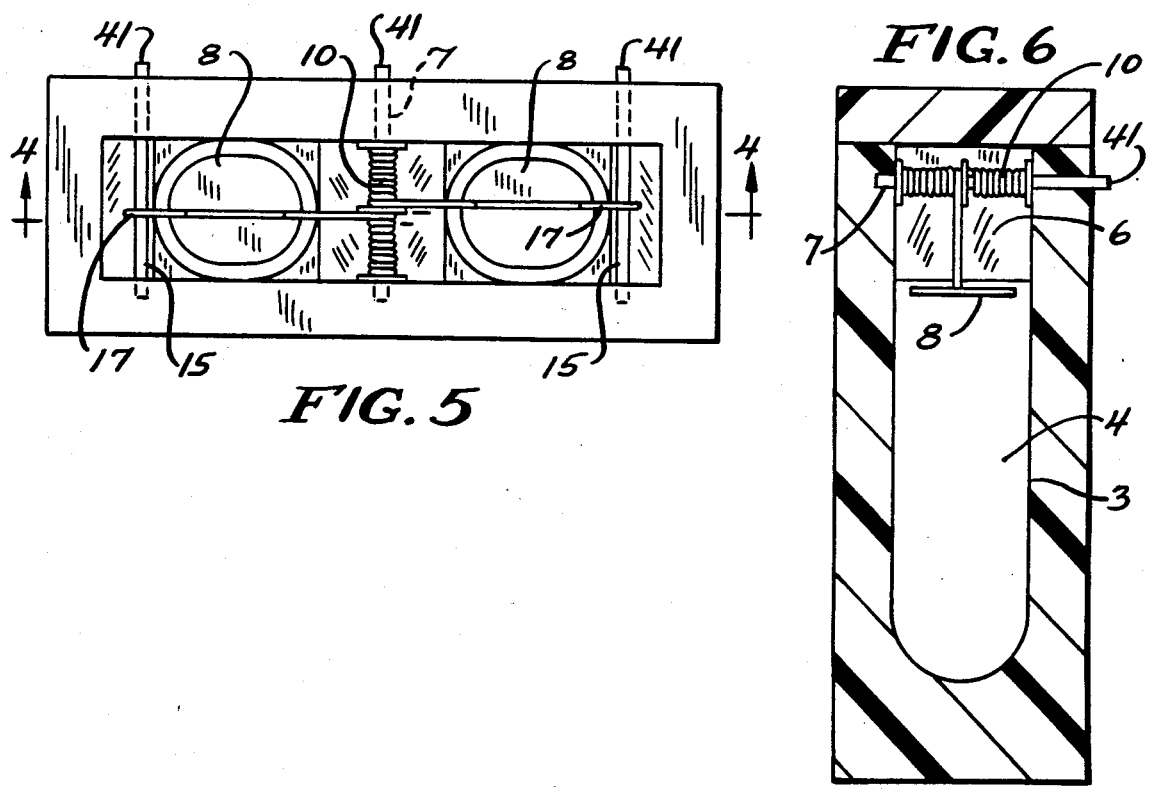

LEVEL SENSING UNIT AND A LEVEL INDICATING DEVICE BASED THEREON

BACKGROUND OF THE INVENTION

Virtually from the beginning of recorded history man has required the means to determine true horizontal and vertical in major construction of all types. This need has continued undiminished to the present time, and in fact the primitive carpenter's level has perservered virtually unchanged for many years. In such a level a vial or generally cylindrical container is partially filled with a liquid so a bubble of air remains. When the vial is placed horizontally on a level surface, i.e., when the axis of the vial is coparallel with the local horizon, the bubble will be equidistant from the ends of the cylinder, i.e., it will be centered. Any deviation from level will be manifested by deviations of the bubble from centrality, i.e., it will be closer to one end than the other. In this application, horizontal level will mean a line coparallel to the local horizon, and vertical level will mean a line perpendicular to the local horizon.

The classical bubble level has limitations in accuracy as well as convenience. Because it relies on visual sighting when used in, e.g., carpentry the user's eyes may need to continually shift between the level and the focus of his work, such as the end of a beam. Consequently, there is a need for a level which can be used by one person without attendant constant close eye contact. It is desirable that such a level be responsive, both in the sense of a rapid response time to changes in horizontal position, and in the sense of having the capability of detecting small deviations from absolute level. Additionally it is paramount that such a level be sturdy, inexpensive, simple to manufacture, and convenient to use under extremes of field conditions such as temperature, humidity, and cramped work space.

Although there are examples of levels and level sensing units based on electroptical devices capable of great precision and accuracy such articles are excluded from further consideration here because of their cost and sometimes because of their inconvenience in operation. The construction worker, for example, needs a much simpler device. Perhaps the best example of an attempt to fill this need is that described in U.S. Pat. No. 4,152,839, which utilizes a sealed capsule containing a bead of mercury which acts much like an air bubble in a vial of liquid. When in a horizontal level position mercury, an electrical conductor, is at the center and in electrical contact with electrodes which energize a current indicating a level status, e.g., a buzzer or bulb. When in a position deviating from horizontal the bead of mercury tends to roll away from the center, breaking electrical contact and deenergizing the circuit. The many possible variations of this theme need not be elaborated on at this time.

The above design is essentially a mercury-actuated switch. An acknowledged limitation of such a switch is its relative sluggish response and insensitivity to small changes, both arising because the extremely high surface tension of mercury requires a relatively large degree of angular change from level for movement of the mercury bead. Although somewhat of an exaggeration, it is almost as if such a mercury-actuated switch exhibits a step response rather than a continual one to changes in angular position of the mercury-containing capsule.

I have devised a simple, yet accurate and inexpensive level sensing unit with a very rapid response time which can readily drive, or be incorporated into, an electrical circuit indicating the state of level and which can be readily incorporated into, e.g., a contractor's level which is rugged, of universal utility, and can be used quite conveniently without eye contact. In one aspect my invention is a level sensing unit as will be described. In another aspect my invention is a level, as for use by carpenters, plumbers, and other tradesman in the construction industry, incorporating the level sensing unit in a simple electrical circuit so as to give audible and/or optical indications of level and/or deviations therefrom.

SUMMARY OF THE INVENTION

The purpose of my invention is to provide a simple, inexpensive, reliable, accurate, and rugged level sensing unit which generally is adaptable to use in the building trades and a level based thereon with audio and/or visual indicators of deviation from a level state as well as direction of deviation. An embodiment is a unit with two counterweighted floats pivotally mounted above two columns of liquid, each float being placed at or below the top of the columns and having an electrically conductive extension, with an electrically conductive strip mounted at the top of each reservoir containing said liquid columns. The floats are so placed relative to the columns of liquid that when the unit is level the extension of each float engages the corresponding electrically conductive strip in electrical contact. But when the unit is so oriented as to deviate from level one or the other float will be pushed up by the buoyant force of the liquid column, thereby disengaging the extension from the electrically conductive strip. By mounting the level sensing unit in a suitable orientation within a larger housing and incorporating the electrically conducting strips and the terminal extensions on the floats into an electrical circuit one can produce a level indicating deviations from level by audiovisual means.

DESCRIPTION OF THE FIGURES

FIG. 4 is a front cross-sectional view of another embodiment of a level sensing unit.

FIG. 5 is a view along 5—5 of FIG. 4.

FIG. 6 is a view along 6—6 of FIG. 4.

DESCRIPTION OF THE INVENTION

Figure 1:
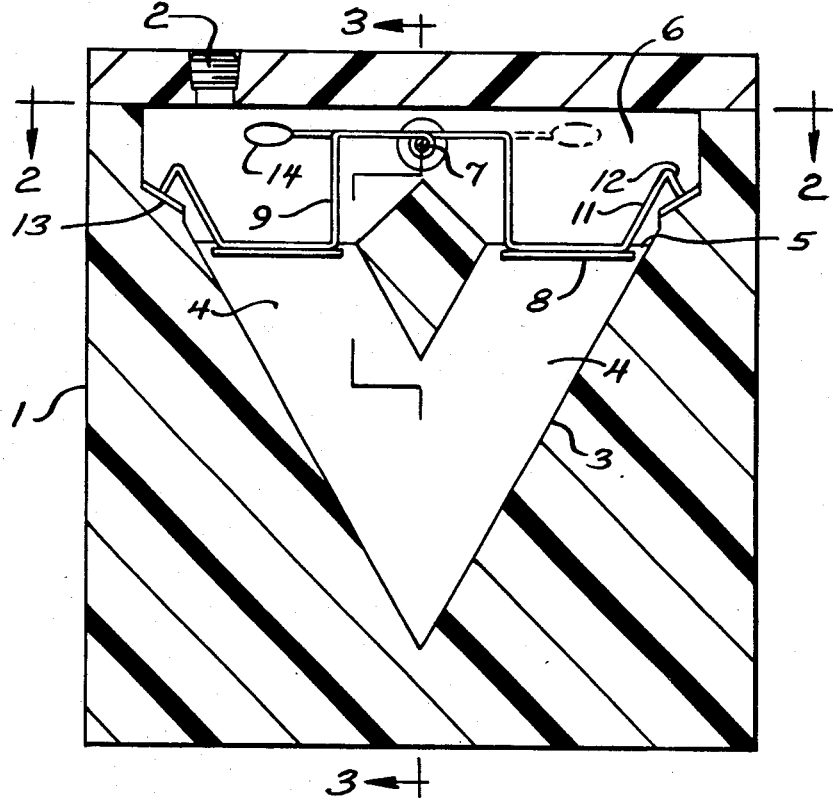
FIG. 1 is a front cross-sectional view of one embodiment of a level sensing unit.

The level sensing unit which is my invention is capable of many design variations which are a matter of choice to one skilled in this art. The detailed description which follows often will indicate some of the possible variations, yet for ease of exposition and understanding the description most usually will be couched in terms of just the embodiment incorporated in the figures. Yet it must be clearly understood and emphasized that the figures represent a number of possible embodiments of an invention all of whose embodiments reside in the invention as claimed.

The level sensing unit comprises a sealed housing, 1 which most generally will be box-like in shape, as in the figures. Because the housing contains liquid it is necessary that the housing material be nonporous, nonabsorbtive, and unreactive with respect to the liquid it is designed to contain. Since the operation of the unit is sensitive to the height of the liquid columns, as described below, it is necessary that the unit be sealed so that the amount of liquid remains constant. However, it also may be advantageous not to have the unit permanently sealed, but rather to have a sealable unit which permits the additions and/or removal of liquid as needed. This may be achieved, for example, by having a plug, such as 2, at the top of the unit which may be removed when liquid adjustment is made and reinserted after adjustment to once again seal the housing, and optionally to be more permanently sealed by being coated with adhesive. Normally the plug will be removed only once —when liquid is initially added to calibrate the level. The unit may be used under extremes of temperature, and the resulting contraction and expansion of the liquid within the columns can, in principle, affect the performance of the unit so that some field adjustment of the liquid column height may be desirable. Similar adjustment of the liquid column height to adjust the sensitivity of the unit also may be desirable.

Where the housing is box-like a front and back, a top and bottom, and two sides are inherent. However, the shape of the housing is not an element of my invention, and it will be easily appreciated that the housing can be of any convenient shape without affecting its performance. If, for example, the housing is spherical the terms top, bottom, etc., have no reference relative to the shape of the housing itself. Yet it must be emphasized that such terms are meaningful with reference to the internal elements of the housing which make up the level sensing unit which is my invention. The description which follows is couched in terms relative to a box-shaped housing for ease of understanding, but always with the realization that the shape of the housing is not critical to the success of the invention and that such descriptive terms are applicable to other housing shapes via the arrangement of the internal elements.

Within the housing are two connected channels, 3, directed generally from top to bottom with the interior, 4, of each channel communicating with the interior of the other. The top of each channel, 5, opens into a compartment, 6, with the opening desirably flared and angled so that the cross-section at each opening is greater than the cross-section of the channel at other points. In operation the channels are filled with a fluid which, during use, may spill into the compartment. The slope of the flared opening then aids in returning the spilled fluid to the channels, or stated differently, the slope prevents accumulation of liquid outside the channels.

The compartment contains an axle, 7, running from the front to the back wall on which are pivotally mounted two floats, 8. The axle is above the channel openings and is located midway between them. Each float is so positioned that its center of gravity is somewhat below that of the axle and is so placed that it is more-or-less centered in the channel just below or within its opening. The float may be of wood, of plastic, or even of a light metal. Preferably it is of a low density material which manifests a cohesive force with a liquid within the channel due to increased surface tension between the float and liquid. It is also desired that the float have as high a surface area as possible so that it experiences the maximum possible buoyant force when the float is in contact with the liquid in the channels. Hence another reason for the channel openings being flared is to increase the surface area available for the float placed therein.

Each float is electrically and mechanically connected to the axle by pivotal means. A particularly simple pivotal means which establishes both the electrical and mechanical connection in a conductive metal strip or wire, 9, attached to the float and angling upward at some point, usually at or beyond the edge of the float nearest the axle, and wrapped around the axle in a series of coils, 10, so as to allow the assembly to pivot on the axle. Since both the axle and coil are of conductive material there is an electrical as well as a mechanical connection made.

Figure 2:
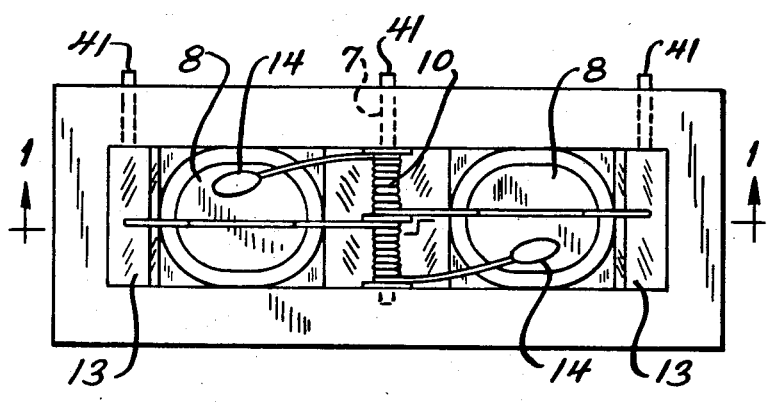
FIG. 2 is a view along 2—2 of FIG. 1.
Figure 3:
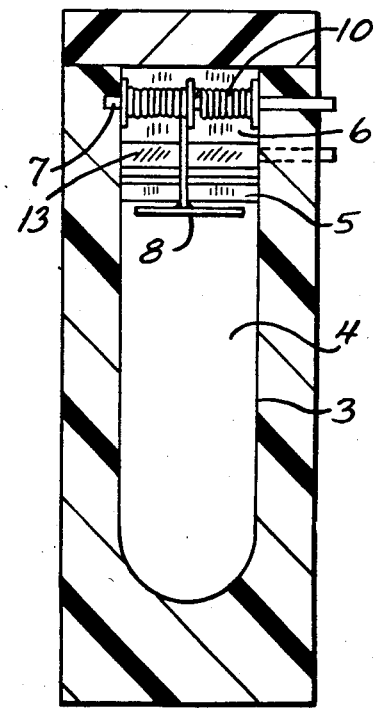
FIG. 3 is a view along 3—3 of FIG. 1.

In the embodiment depicted in FIGS. 1-3 each float has an extension, 11, of the pivotal means strip 9, directed toward the top of the housing but terminating in a tip, 12, directed toward the bottom of the housing. The purpose of this extension is to engage in electrical contact with electrically conducting strips, 13, mounted at the junction of each channel and the compartment, i.e., at the rim of the channel openings, hence such extensions themselves must be of electrically conducting material. Since the axle and the pivotal means on said axle are a common electrical contact in the operation of the unit as explained within, the extensions must also be electrically connected to the axle or pivotal means. It is also desirable to have the floats counterweighted so that they are responsive to a minimal buoyant force exerted by the channel liquid as this will increase the sensitivity of the unit in operation as elaborated upon within. The embodiment in FIGS. 1-6 is a convenient arrangement to accomplish the preceding by having conductive material loosely wound in a series of coils, 10, on the axle acting as the pivotal means, the conductive material connected to the float placed within the opening of a channel and continuing beyond the float so as to arch over the electrically conducting strip placed in the opening, said conductive material optionally weighted, 14, on the opposite side of the axle to give a counterweighted system. Both the axle and conducting strips 13 are electrically connected to terminals or contacts, 41, on the outside of the housing which are incorporated in whatever electrical circuit is used, such as the one described below.

The operation of the unit is most conveniently described with reference to a housing whose bottom surface is flat and coparallel to the line connecting the openings of each channel. When such a unit is oriented so that its bottom surface is level, i.e., coparallel to the local horizon, the extension of each float engages in electrical contact with the electrically conductive strip on the rim of each channel opening. Each float will experience little if any buoyant force arising from the column of liquid in the channel.

As the unit is rotated clockwise around an axis passing from front to back the left hand edge of the bottom surface will become higher than the right hand edge. Since the top of the liquid in the two columns will tend to remain level, the liquid column in the right hand channel will rise exerting a buoyant force on the right hand float, tending to raise the float thereby disengaging its extension from electrical contact with the conductive strip. Analogously, when the unit is rotated counterclockwise the right hand edge of the bottom is the higher one and liquid will rise in the left hand channel, exerting a buoyant force on the float placed therein and tending to break electrical contact of its extension with the conductive material on the rim.

Another embodiment as depicted without the optional counterweight in FIGS. 4-6 differs somewhat from the foregoing in being somewhat simpler in design. In this embodiment the conductive strips 13 are replaced by bars, 15, mounted in the compartment directly above the floats between the front and back wall. The extension, 16, of the pivotal means strip is directed upwards toward the bars 15 and terminates in a tip, 17, angled over said bars. Thus, when a tip 17 and bar 15 are in electrical contact the float is essentially supported on the bar. When the float is supported by the column of liquid the tip and bar are not in physical or electrical contact. The operation of this embodiment is otherwise the same as is described above.

Since the buoyant force will depend on the density of the liquid it is desirable to have the liquid of as high a density as possible while remaining nonviscous at extremes of temperature. For example, when used in tasks typical of the construction industry such extremes may be between about −40° C. to about 55° C. It is also desirable to have as low a surface tension as possible to eliminate unresponsiveness, and in practice a surface tension less than about 100 dynes per cm, preferably no more than about 80 dynes per cm, is sought. The angular deflection from level necessary to break electrical contact will depend upon the density of the liquid in the channel, the height of the liquid column at level relative to the placement of the float within the channel, the density of the float, the extent to which the float is counterweighted, and the dimensions of the extension vis-a-vis the float and conducting strip. By controlling these variables the sensitivity of the level sensing unit also may be controlled. It is easily possible to construct units sensitive to angulara deviations from level of about 0 degrees 4 minutes 30 seconds, which is 0.031 (1/32) inch in 2 feet.

Many liquids may be used in the unit and are largely a matter of choice subject to some general requirements. The liquid must be unreactive with materials with which it comes into contact and has a specific gravity of at least 1, preferably at least 1.5, and even more preferably at least 2.0, with the higher values being more advantageous. The liquid must flow readily at the minimum operating temperatures contemplated, and should not have a high vapor pressure at maximum contemplated operating temperatures. The liquid needs to be nonconductive, and neither reactive with nor absorbed by the housing or any material it is likely to contact. Halogenated hydrocarbons, such as methylene dibromide, exemplify a class of liquids which may be used.

Figure 7:
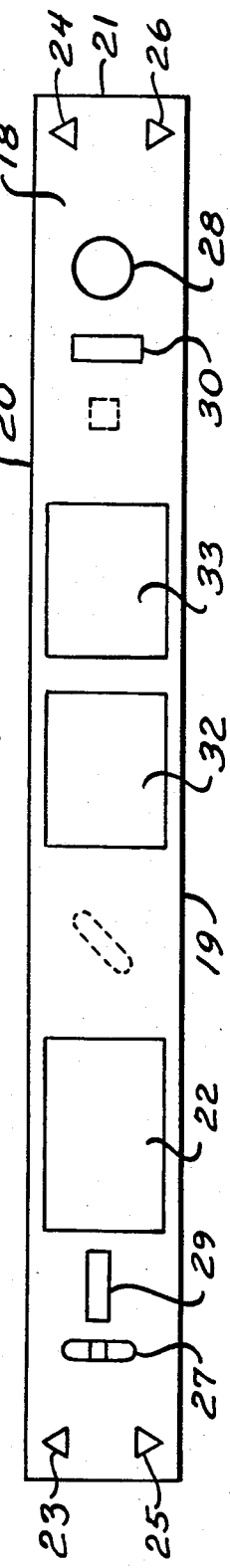
FIG. 7 is a front view of a level indicating device.

. Many contractor's levels incorporating two of the level sensing units described, so as to measure both the horizontal and vertical (plumb) level, may be designed and an embodiment is shown in FIG. 7. The level 18 has a generally rectangular, beam-like shape and incorporates two level sensing units oriented 90° relative to each other. If the surface 19 be designated as that side which is to be placed on the surface whose level is to be measured, the sides 20 and 21 will be the "top" when the level is used as a level and plumb device, resp. Thus the upper and lower surfaces, 20 and 19, resp., must be substantially parallel, and surface 21 and its opposed counterpart substantially perpendicular, to the lower surface. If the right hand level be designated as the plumb level, then it will be oriented by rotating FIG. 1 (or 4) 90° clockwise and the other level sensing unit will be oriented as in FIG. 1. The level also contains a battery compartment, 22, for releasably containing batteries necessary to power an electrical circuit incorporating the level sensing unit, at least one set, and optionally two sets, of indicator lights, 23-26, on each end to indicate deviations from level, an on-off switch, 27, a tone generator, 28, such as a buzzer, and optionally one or more level and plumb vials, 29 and 30, resp., used as rough indicators of level. Two level sensing units 42 and 43, which measure level and plumb, respectively, are at the nub of the level.

Figure 8:
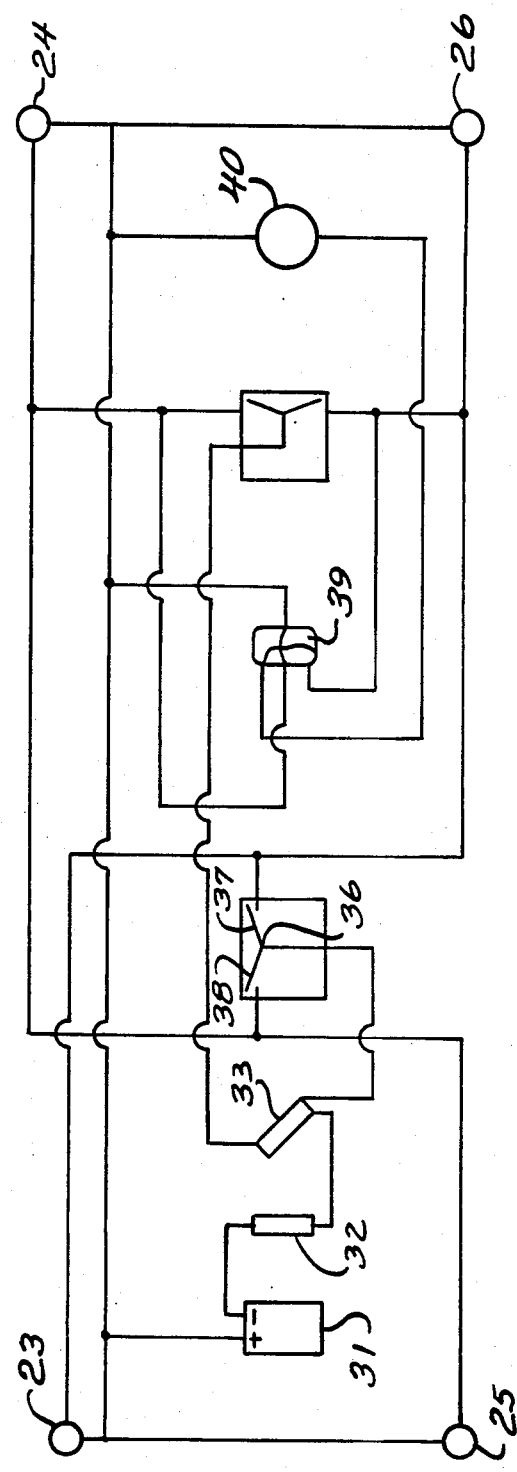
FIG. 8 is a circuit diagram of one simple circuit incorporating the level sensing units of this invention in a level indicating device.

The operation of the level may be better understood by referring to FIG. 8, which shows one of several simple circuits which may be incorporated into the level. A battery, 31, contained in the level's battery compartment supplies power and may be, for example, a simple 9 volt battery of the type commonly produced. Switch 32 is an on/off switch for the circuit. An optional mercury switch,33, operative for both the level and plumb mode, may be incorporated to eliminate chatter. Both 34 and 35 are those portions of the level and plumb sensing units, resp., incorporated into the electrical circuit. Referring to FIGS. 1 (and 4) the axle 7 is that part of the electrical circuit as designated by 36, and the right- and left-hand strips 13 (or bars 15) are that part of the circuit as designated by 37 and 38, resp. A relay, 39, such as a 5 VDC relay, is normally open; 40 is a tone indicating device; and 23-26 are indicator lights.

Where the device is used to measure level mercury switch 33 and level sensing unit 34 determine the state of the electrical circuit. So, e.g., if the surface measured is not level and the left hand side is the higher one, the left hand float of 34 will close the circuit (38) and the right hand side (37) will be open. Following the wiring diagram it can be seen that indicator lights 24 and 25 will be on. Since the relay is normally open and will close *only* when both the right and left hand floats close the electrical circuit, the tone device will be silent. If the measuring surface is not level but the right hand side of the device is the higher one, 37 will close the circuit, 38 will not make contact, indicator lights 23 and 26 will be on and the tone device again will be silent. Finally, if the surface measured is level and both floats of 34 close the electrical circuit (both 37 and 38 make contact) then all lights are on, the relay is closed, and a tone will sound. Thus, one using the level may place the device on a surface, change the orientation of the surface without looking at the level, and merely wait for the tone indicator to go on as a signal that a level status has been reached. By glancing at the status of the indicator lights the operator also will immediately know the direction of deviation from level and therefore know the direction in which corrections must be made.

When used to mesure plumb the device operates similarly. Briefly, if the unit deviates from a plumb in a direction corresponding to a clockwise orientation indicator lights 24 and 25 will be on; if the deviation corresponds to a counterclockwise rotation then lights 23 and 26 are on; and if there is exact plumb all the lights as well as the tone indicator device will be on.

One skilled in the art will recognize that many combinations of the level sensing unit described herein, as well as many circuit variants, may be combined to give various embodiments of a contractor's level. All such embodiments are intended to be subsumed within the aforementioned description.

What is claimed is:

1. A level sensing unit comprising a sealed housing with a front and back wall, a top and bottom, and two side walls containing two communicably interconnected channels oriented from bottom to top as fluid reservoirs, each of said channels opening into a compartment containing an axle mounted between the front and back walls, said axle located between the two channels at a point above the opening of said channels, a float for each channel in electrical contact with and connected by pivotal means to the axle with the center of gravity of the float below the axle, each float having an electrically conductive extension in electrical contact with the axle and directed toward a strip of electrically conductive material mounted within the housing, said channels filled with a nonconducting unreactive fluid to a height such that when the housing is rotated around an axis passing from the front to the back wall there is some degree of rotation where the extension of each of the floats is engaged in electrical contact with the electrically conductive strip and where deviations on either side of said angle results in one float being buoyantly disengaged.

2. The level sensing unit of claim 1 where the pivotal means is a series of coils wound around the axle.

3. The level sensing unit of claim 1 where the strip of electrically conducting material is placed at the junction of the opening of each channel and the compartment.

4. The level sensing unit of claim 1 where the strip of electrically conducting material is a bar placed in the compartment above the floats between the front and back wall.

* * * * *